United States Patent [19]

Akutsu et al.

[11] Patent Number: 4,889,672

[45] Date of Patent: Dec. 26, 1989

[54] PROCESS FOR PRODUCING CERAMIC MOLDING

[75] Inventors: Mitsuo Akutsu, Tokyo; Keiji Tabata, Urawa, both of Japan

[73] Assignee: Adeka Argus Chemical Co., Ltd., Tokyo, Japan

[21] Appl. No.: 151,608

[22] Filed: Feb. 2, 1988

[30] Foreign Application Priority Data

Feb. 10, 1987 [JP] Japan .................................. 62-28729

[51] Int. Cl.$^4$ ............................................. C04B 33/32
[52] U.S. Cl. ........................................ 264/63; 528/407
[58] Field of Search ........................... 264/63; 528/407

[56] References Cited

U.S. PATENT DOCUMENTS 2,773,048 12/1956 Formo et al. ...................... 528/407
2,829,131 4/1958 Greenspan et al. ................ 528/407

Primary Examiner—James Derrington
Attorney, Agent, or Firm—Young & Thompson

[57] ABSTRACT

The process for producing a ceramic molding of the present invention comprises adding 0.1 to 20 parts by weight of an adduct of epoxidized polybutadiene with an organic amine to 100 parts by weight of a ceramic powder.

10 Claims, No Drawings

PROCESS FOR PRODUCING CERAMIC MOLDING

BACKGROUND OF THE INVENTION

1. Field of the Invention

This invention relates to a process for producing a ceramic molding. More particularly, it relates to a process for producing a ceramic molding which comprises using an adduct of epoxidized polybutadiene with an organic amine as a binder.

2. Description of the Prior Art

Ceramics are generally made from various materials and have various uses. Those obtained from, for example, ferrite, alumina, carborundum, silicon nitride or zirconia are processed by adding a binder comprising one or more organic compounds to a powder thereof, kneading the resulting mixture and then molding the same into a molding product of a complicated shape and a high dimensional accuracy. Said binder should cause uniform shrinkage of the molding at the subsequent degreasing or firing step. However it is frequently observed that non-uniform dispersion of a binder, which is an organic material, in a ceramic, which is an inorganic material, brings about not only an insufficint strength or poor surface condition of an unfired molding but also industrially serious troubles such as cracking or non-uniform shrinkage of the molding at the degreasing or firing step.

SUMMARY OF THE INVENTION

It is an object of the present invention to provide a process for producing a ceramic molding by which a molding having a high density, complicated shape or high dimensional accuracy as well as an excellent surface condition and high strength can be obtained without causing any troubles such as cracking or non-uniform shrinkage.

The process for producing a ceramic molding of the present invention comprises adding 0.1 to 20 parts by weight of an adduct of epoxidized polybutadiene with an organic amine to 100 parts by weight of a ceramic powder.

DETAILED DESCRIPTION OF THE INVENTION

As the starting ceramic to be used in the process of the present invention, any of ceramics including oxides such as alumina, silica, titania, zirconia, cordierite, forsterite and ferrite and nonoxides such as silicon carbide. Silicon nitride and sialon may be employed without any limitation.

The epoxidized polybutadiene to be used in the preparation of the adduct of epoxidized polybutadiene with an organic amine employed in the process of the present invention is an epoxide of butadiene homopolymer or copolymer which has a molecular weight of approximately 500 to 10,000, comprises at least 70 mol %, preferably at least 90 mol %, of 1,3-butadiene and contains 2 to 20% by weight, preferably 4 to 10% by weight, of oxirane oxygen. Examples of the comonomer available in the preparation of said copolymer include isoprene, pentadiene and styrene.

As the base polybutadiene, either 1,2-polybutadiene mainly involving terminal double bonds, 1,4-polybutadiene mainly involving internal double bonds or polybutadiene involving both the terminal and internal double bonds at random may be employed.

In the preparation of the adduct, any organic amine may be employed without limitation so long as it has a reactive NH group.

Examples of such organic amines include primary amines such as methylamine, ethylamine, propylamine, butylamine, isobutylamine, octylamine, dodecylamine, octadecylamine, cyclohexylamine, benzylamine, aniline, ethanolamine, methoxypropylamine, ethoxypropylamine, dimethylaminopropylamine, diethylaminoethylamine, morpholinopropylamine, piperazinopropylamine and pipecolinopropylamine; secondary amines such as diethylamine, dibutylamine, diisobutylamine, dioctylamine, diethanolamine, diisopropanolamine and dibenzylamine; and heterocyclic amine compounds such as piperidine, morpholine, pipecoline, lupetidine, N-methylpiperazine and N-methylhomopiperazine. Among these amines, secondary ones and heterocyclic amine compounds are particularly preferable. In particular, an adduct comprising morpholine as an organic amine compound favorably exerts a remarkable effect.

The adduct of the present invention may be obtained by adding said amine compound to said epoxidized polybutadiene. It contains a

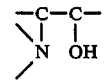

between the epoxy group of the epoxidized polybutadiene and the NH group of the amine compound in a molecule. In the preparation of the adduct of the present invention, the reaction ratio of epoxy groups is not particularly restricted. It is generally preferable that approximately 50 to 100 mol % of epoxy groups of the epoxidized polybutadiene react with the amine compound.

The adduct of the present invention can be readily prepared by reacting epoxidized polybutadienes with an organic amine compound under heating in the presence of a basic catalyst if required.

To further illustrate the adduct of the present invention, and not by way of limitation, the following Synthesis Example will be given.

SYNTHESIS EXAMPLE

Adduct of epoxidized 1,2-polybutadiene with morpholine 1300 g of epoxidized 1,2-polybutadiene BF-1000 (mfd. by Adeka Argus Chemical Co., Ltd., average molecular weight: 1000, oxirane oxygen content: 8%) was mixed with 1131 g (two equivalents to the oxirane oxygen) with stirring under nitrogen gas stream at a temperature of 140° to 150° C. for 25 hours. Then 588 g of excess morpholine was removed therefrom at 150° C./4 mm Hg (conversion on an epoxy group basis: 96%) to thereby give a pale yellow glassy solid product having a softening point of approximately 50° C. (adduct No. 1).

The IR spectrum of this product showed a peak assignable to the hydroxyl group at 3450 $cm^{-1}$, one assignable to the double bond at 3080 $cm^{-1}$ and one assignable to the ether linkage at 1120 $cm^{-1}$ but none assignable to the epoxy ring was observed at 830 cm$^{-1}$, indicating that it was the desired adduct.

The above procedure was followed to thereby give the following adducts.

| Adduct No. | Epoxidized polybutadiene | Amine | Addition ratio *1 (%) |
|---|---|---|---|
| 2 | BF-1000 | Morpholine | 67 |
| 3 | BF-1000 | Diethylamine | 97 |
| 4 | BF-1000 | Diethanolamine | 94 |
| 5 | Epoxidized 1,4-polybutadiene (MW: 1800, oxirane oxygen: 8.2%) | Morpholine | 92 |
| 6 | Epoxidized 1,4-polybutadiene (MW: 3500, Oxirane oxygen: 5.4%) | Morpholine | 88 |

*1: Addition ratio of amine on an epoxy group basis.

The adduct of the present invention may be used alone as a binder in the production of a ceramic molding. Alternately it may be used together with one or more conventional binders, if required, since it is highly effective in improving the dispersibility of an inorganic powder. In the latter case, it is preferable that the content of the adduct of the present invention amount to 10% by weight or more based on the total binder component.

Examples of known binders which can be used together with the adduct of the present invention include wax, Japan wax, polyethylene, polypropylene, polybutadiene, polyvinyl alcohol, polyvinyl acetate, methylcellulose, cellulose acetate, polyacrylate, polystyrene, polyester, ethylene/vinyl acetate copolymer and ethylene/ethyl acrylate copolymer.

The adduct of the present invention may be used as such as a binder. Alternately it may be dispersed or dissolved in water or organic solvent(s) prior to the use. When it is to be employed in an aqueous system, it is effective to emulsify the same with the use of a small amount of a surfactant, if required. Further one or more organic solvents may be employed.

In the production of a molding according to the process of the present invention, said binder is added to said ceramic powder followed by kneading. The resulting mixture is then molded by any convenient method, for example, press molding, cast molding, rubber press molding, compression molding, tape molding, extrusion molding or injection molding. The ceramic molding thus obtained may be used for any conventional purpose, for example, as dielectric, magnetic material, piezonelectric device, IC substrate, IC package, insulator, thermal insulant, corrosion-resistant material or hard-wearing material without limitation.

To further illustrate the present invention, the following Examples will be given.

EXAMPLE 1

Ten parts by weight of polyethylene wax and 5 parts by weight of a sample compound were added to 85 parts by weight of a silicon carbide powder (10 m$^2$/g) followed by kneading with a Brabender Plastomill at 160° C. and 60 rpm. During the kneading step, a change in the torgue was observed and the period of time taken for the dispersion of agglomerated silicon carbide particles was measured. Further the dispersibility of the silicon carbide in the organic materials was observed under an electron microscope. Table 1 shows the results.

TABLE 1

| Test No. | Sample compound | Dispersion time (min) | Dispersibility |
|---|---|---|---|
| 1-1 | polyethylene wax | 40 | medium |
| 1-2 | adduct No. 1 | 15 | good |
| 1-3 | adduct No. 2 | 15 | " |
| 1-4 | adduct No. 3 | 20 | " |
| 1-5 | adduct No. 4 | 15 | good |
| 1-6 | adduct No. 5 | 15 | " |
| 1-7 | adduct No. 6 | 20 | " |

EXAMPLE 2

To 100 parts by weight of ferrite (CaO.Fe$_2$O$_3$), 25 parts by weight of a dispersion comprising 20% by weight of a binder and 80% by weight of water was added. After being kneaded in a kneader, the resulting mixture was extruded to give a rod of 5 mm in diameter. The smoothness of the surface of this rod was evaluated. Further its flexural breaking strength (kg/cm$^2$) was measured by drying the rod at 150° C. for an hour, supporting the same at intervals of 5 cm and applying a load to the center thereof. Table 2 shows the results.

TABLE 2

| Test No. | Binder | Surface smoothness | Flexural breaking strength |
|---|---|---|---|
| 2-1 | polyvinyl alcohol*$^1$ | medium | 113 |
| 2-2 | adduct No. 1 | good | 168 |
| 2-3 | adduct No. 2 | " | 160 |
| 2-4 | adduct No. 3 | " | 155 |
| 2-5 | adduct No. 4 | " | 164 |
| 2-6 | adduct No. 5 | " | 158 |
| 2-7 | adduct No. 6 | " | 152 |

*$^1$: Degree of polymerization: 1700; degree of saponification: 99% by mol.

EXAMPLE 3

To 100 parts by weight of a silicon nitride powder (12 m$^2$/g). 6 parts by weight of ethylene/vinyl acetate copolymer, 8.8 parts by weight of polybuthyl methacrylate, 3 parts by weight of polyethylene wax and 4 parts by weight of a sample compound were added. Then the procedure of Example 1 was followed. Table 3 shows the results.

TABLE 3

| Test No. | Sample compound | Dispersion time (min) | Dispersibility |
|---|---|---|---|
| 3-1 | none | 32 | medium |
| 3-2 | adduct No. 1 | 5 | good |
| 3-3 | adduct No. 2 | 8 | " |
| 3-4 | adduct No. 3 | 10 | " |
| 3-5 | adduct No. 4 | 7 | " |
| 3-6 | adduct No. 5 | 8 | " |
| 3-7 | adduct No. 6 | 11 | " |

EXAMPLE 4

To 100 parts by weight of a zirconia oxide powder (11.9 m$^2$/g, 4 parts by weight of ethylene/vinyl acetate copolymer, 5 parts by weight of polybuthyl methacrylate, 6 parts by weight of polyethylene wax and 3 parts by weight of a sample compound were added. Then the procedure of Example 1 was followed. Table 4 shows the results.

TABLE 4

| Test No. | Sample compound | Dispersion time (min) | Dispersibility |
|---|---|---|---|
| 4-1 | none | 35 | medium |

TABLE 4-continued

| Test No. | Sample compound | Dispersion time (min) | Dispersibility |
| --- | --- | --- | --- |
| 4-2 | adduct No. 1 | 7 | good |
| 4-3 | adduct No. 2 | 9 | " |
| 4-4 | adduct No. 3 | 10 | " |
| 4-5 | adduct No. 4 | 9 | " |
| 4-6 | adduct No. 5 | 8 | " |
| 4-7 | adduct No. 6 | 10 | " |

EXAMPLE 5

To 100 parts by weight of an alumina oxide powder (11.9 m²/g), 60% by weight of a dispersion comprising 2.5% by weight of a binder and 97.5% by weight of water was added followed by stirring. The slurry thus obtained was granulated with a spray drier and then press-molded into a plate (10×30×2 mm). The strength and surface condition of the molding thus obtained were evaluated.

Table 5 shows the results.

TABLE 5

| Test No. | Binder | Molding strength | Surface condition |
| --- | --- | --- | --- |
| 5-1 | polyvinyl alcohol*[1] | poor | poor |
| 5-2 | polyvinyl alcohol**[2] | medium | medium |
| 5-3 | adduct No. 1 | good | good |
| 5-4 | adduct No. 2 | " | " |
| 5-5 | adduct No. 3 | " | " |
| 5-6 | adduct No. 4 | " | " |
| 5-7 | adduct No. 5 | " | " |
| 5-8 | adduct No. 6 | " | " |

*[1]Degree of polymerization: 1700: degree of saponification: 99% by mol.
**[2]Content of binder: 5% by weight.

EXAMPLE 6

To 100 parts by weight of an alumina oxide powder (11.9 m²/g), 60% by weight of a dispersion comprising 2% by weight of 1,2-octadecanediol, 1% by weight of a binder and 97% by weight of water was added followed by stirring. The slurry thus obtained was granulated with a spray drier and then press-molded into a plate (10×30×2 mm). The strength and surface condition of the obtained molding were evaluated. Table 6 shows the results.

TABLE 6

| Test No. | Binder | Molding strength | Surface condition |
| --- | --- | --- | --- |
| 6-1 | PVA*[1] | medium | medium |
| 6-2 | adduct No. 1 | very good | very good |
| 6-3 | adduct No. 2 | " | " |
| 6-4 | adduct No. 3 | " | " |
| 6-5 | adduct No. 4 | " | " |
| 6-6 | adduct No. 5 | " | " |
| 6-7 | adduct No. 6 | " | " |

*[1]5% by weight of polyvinyl alcohol having a degree of polymerization of 1700 and a degree of saponification of 99% by mol and no 1,2-octadecanediol was employed.

As described above, the binder used in the process of the present invention is highly effective not only in dispersing the starting ceramic powder but also as a binder. Thus the ceramic molding produced by the process of the present invention has a high strength and an excellent surface condition.

What is claimed is:

1. A process for the production of a ceramic molding comprising forming a molding composition comprised of an admixture of (1) a ceramic powder and (2) an adduct of an epoxidized polybutadiene with an organic amine having a reactive NH group, said adduct being present in said admixture in an amount in the range of 0.1 to 20 parts by weight to 100 parts by weight of said ceramic powder, and firing said molding composition to produce said ceramic molding.

2. The process of claim 1 wherein said epoxidized polybutadiene comprises an epoxide of a butadiene homopolymer or copolymer which comprises at least 70 mol. % of 1,3-butadiene and having a molecular weight in the range of 500 to 10,000.

3. The process of claim 2 wherein said epoxidized polybutadiene comprises at least 90 mol. % of 1,3-butadiene.

4. The process of claim 1 wherein said polyepoxidized polybutadiene comprises from 2 to 20% by weight of oxirane oxygen.

5. The process of claim 4 wherein said polyepoxidized polybutadiene comprises from 4 to 10% by weight of oxirane oxygen.

6. The process of claim 1 wherein said organic amine is selected from the group consisting of primary, secondary and heterocyclic amines.

7. The process of claim 1 wherein said organic amine comprises morpholine.

8. The process of claim 1 wherein said adduct of epoxidized polybutadiene with an organic amine is formed by the reaction of 50 to 100 mol. % of the epoxy groups on said epoxidized polybutadiene with said organic amine.

9. The process of claim 1 wherein said organic amine is selected from the group consisting of methylamine, ethylamine, propylamine, butylamine, isobutylamine, octylamine, dodecylamine, octadecylamine, cyclohexylamine, benzylamine, aniline, ethanolamine, methoxypropylamine, ethoxypropylamine, dimethylaminopropylamine, diethylaminoethylamine, morpholinopropylamine, piperazinopropylamine, pipecolinopropylamine, diethylamine, dibutylamine, diisobutylamine, dioctylamine, diethanolamine, diisopropanolamine, dibenzylamine, piperidine, morpholine, pipecoline, lupetidine, N-methylpiperazine and N-methylhomopiperazine.

10. The process of claim 1 wherein said adduct is admixed with said ceramic powder while admixed with water or an organic solvent for same.

* * * * *